United States Patent
Wang et al.

(10) Patent No.: US 12,242,689 B2
(45) Date of Patent: Mar. 4, 2025

(54) TOUCH DISPLAY SUBSTRATE, MANUFACTURING METHOD, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Wei Wang, Beijing (CN); Shun Zhang, Beijing (CN); Yi Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/019,628

(22) PCT Filed: Jan. 30, 2022

(86) PCT No.: PCT/CN2022/075222
§ 371 (c)(1),
(2) Date: Feb. 3, 2023

(87) PCT Pub. No.: WO2023/142118
PCT Pub. Date: Aug. 3, 2023

(65) Prior Publication Data
US 2024/0256075 A1 Aug. 1, 2024

(51) Int. Cl.
*G06F 3/041* (2006.01)

(52) U.S. Cl.
CPC .......... *G06F 3/04164* (2019.05); *G06F 2203/04103* (2013.01); *G06F 2203/04107* (2013.01)

(58) Field of Classification Search
CPC .......... G06F 3/04164; G06F 2203/04103
See application file for complete search history.

(56) References Cited

U.S. PATENT DOCUMENTS

2018/0067599 A1 3/2018 Cai et al.
2018/0356927 A1 12/2018 Sasaki et al.
(Continued)

FOREIGN PATENT DOCUMENTS

CN 107168574 A 9/2017
CN 107315500 A 11/2017
(Continued)

*Primary Examiner* — Robert J Michaud
(74) *Attorney, Agent, or Firm* — MUNCY, GEISSLER, OLDS & LOWE, P.C.

(57) ABSTRACT

The present disclosure provides a touch display substrate, a manufacturing method thereof, and a display device. The touch display substrate includes a base substrate and a touch layer, the touch layer includes a plurality of touch units, the plurality of touch units includes a plurality of first touch units with complete touch patterns and a plurality of second touch units with incomplete touch patterns, at least a part of the plurality of second touch units is arranged in an outer edge region of the touch layer, a ratio of an area of the touch pattern of the second touch unit to an area of the touch pattern of the first touch unit is greater than 0 and less than or equal to a first threshold, and/or greater than or equal to a second threshold and less than 100%, and the first threshold is less than the second threshold.

17 Claims, 9 Drawing Sheets

(56) References Cited

U.S. PATENT DOCUMENTS

| | | |
|---|---|---|
| 2019/0004626 A1 | 1/2019 | Ko et al. |
| 2020/0081582 A1 | 3/2020 | Yatsu et al. |
| 2020/0089350 A1 | 3/2020 | Han |
| 2020/0104014 A1 | 4/2020 | Gong |
| 2020/0133410 A1 | 4/2020 | Tsai et al. |
| 2020/0210027 A1 | 7/2020 | Ma et al. |
| 2020/0371644 A1 | 11/2020 | Choi et al. |
| 2021/0091320 A1 | 3/2021 | Choi et al. |
| 2021/0208715 A1 | 7/2021 | Yang et al. |
| 2022/0100303 A1 | 3/2022 | Lee et al. |
| 2023/0093856 A1* | 3/2023 | Kim ............... G06F 3/0443 345/174 |

FOREIGN PATENT DOCUMENTS

| | | |
|---|---|---|
| CN | 107807755 A | 3/2018 |
| CN | 109144306 A | 1/2019 |
| CN | 109725771 A | 5/2019 |
| CN | 109859648 A | 6/2019 |
| CN | 110888562 A | 3/2020 |
| CN | 110928434 A | 3/2020 |
| CN | 111104003 A | 5/2020 |
| CN | 212515770 U | 2/2021 |
| CN | 112635519 A | 4/2021 |
| CN | 113253872 A | 8/2021 |
| CN | 214098387 U | 8/2021 |
| CN | 113434058 A | 9/2021 |
| CN | 113552970 A | 10/2021 |
| JP | 2012208749 A | 10/2012 |
| WO | WO2020153593 A1 | 7/2020 |

* cited by examiner

TOUCH DISPLAY SUBSTRATE, MANUFACTURING METHOD, AND DISPLAY DEVICE

CROSS-REFERENCE TO RELATED APPLICATIONS

This application is the U.S. national phase of PCT Application No. PCT/CN2022/075222 filed on Jan. 30, 2022, the entire contents of which are hereby incorporated by reference.

TECHNICAL FIELD

The present disclosure relates to the field of display technology, in particular to a touch display substrate, a manufacturing method thereof, and a display device.

BACKGROUND

In the related art, touch patterns at special positions, such as corners, in touch display products are partially missing as compared to touch patterns in a display region, resulting in a poor touch function at these positions. Therefore, it is very difficult to ensure the touch function at these special positions.

SUMMARY

An object of the present disclosure is to provide a touch display substrate, a manufacturing method thereof, and a display device, so as to improve the touch function of the display substrate.

The present disclosure provides the following technical solutions.

In one aspect, the present disclosure provides in some embodiments a touch display substrate, which includes a base substrate and a touch layer arranged on the base substrate. The touch layer includes a plurality of touch units arranged in an array form, the plurality of touch units includes a plurality of first touch units with complete touch patterns and a plurality of second touch units with incomplete touch patterns, at least a part of the plurality of second touch units is arranged in an outer edge region of the touch layer, a ratio of an area of the touch pattern of the second touch unit to an area of the touch pattern of the first touch unit is greater than 0 and less than or equal to a first threshold, and/or greater than or equal to a second threshold and less than 100%, and the first threshold is less than the second threshold.

In a possible embodiment of the present disclosure, the first threshold is 20% and/or the second threshold is 70%.

In a possible embodiment of the present disclosure, the touch display substrate includes a display region and a peripheral region surrounding the display region. The plurality of touch units is arranged in the display region and includes a plurality of first touch electrodes extending along a first direction and arranged along a second direction, and a plurality of second touch electrodes extending along the second direction and arranged along the first direction, and the first direction crosses the second direction. The peripheral region is provided with a plurality of peripheral lines, the plurality of peripheral lines includes a plurality of first touch lines and a plurality of second touch lines, the first touch line is coupled to the first touch electrode, and the second touch line is coupled to the second touch electrode.

In a possible embodiment of the present disclosure, when the ratio of the area of the touch pattern of the second touch unit to the area of the touch pattern of the first touch unit is greater than 0 and less than or equal to the first threshold, an outer contour of an orthogonal projection of each touch pattern of at least a part of the plurality of second touch units onto the base substrate is partially indented to form a notch.

In a possible embodiment of the present disclosure, the outer contour of the orthogonal projection of each touch pattern of at least a part of the plurality of second touch units onto the base substrate includes a notch contour section corresponding to the notch and a main body contour section other than the notch contour section, the notch contour section includes a first end and a second end coupled to the main body contour section, the notch contour section further includes a first transition section and a second transition section in sequence from the first end to the second end, and in a direction from the first end to the second end, an indentation of the first transition section increases gradually, and an indentation of the second transition section decreases gradually.

In a possible embodiment of the present disclosure, the first transition section is of a curved shape and is in smooth transition connection with the main body contour section.

In a possible embodiment of the present disclosure, the second transition section is of a linear shape.

In a possible embodiment of the present disclosure, the orthogonal projection of each touch pattern of at least a part of the plurality of second touch units onto the base substrate is provided with a blank region in a region corresponding to the notch; and/or the touch display substrate further includes a dummy shielding pattern arranged on the base substrate, and an orthogonal projection of the dummy shielding pattern onto the base substrate is at least partially arranged in an orthogonal projection of the notch onto the base substrate.

In a possible embodiment of the present disclosure, the first touch line is arranged at a side of the second touch line close to the display region, and the dummy shielding pattern and/or the blank region is arranged between at least one of the first touch lines and at least one of the second touch lines.

In a possible embodiment of the present disclosure, at least one of the first touch lines is a first touch access line, and a portion of the first touch access line corresponding to the notch extends along an contour of the notch; a portion of each of the plurality of second touch lines corresponding to the notch is not indented along the contour of the notch; and the dummy shielding pattern and/or the blank region is arranged between the first touch access line and the plurality of second touch lines.

In a possible embodiment of the present disclosure, the plurality of peripheral lines further includes at least one shielding line arranged between the first touch access line and the plurality of second touch lines and arranged at a side of the dummy shielding pattern and/or the blank region away from the display region, and a portion of the shielding line corresponding to the notch is not indented along the contour of the notch.

In a possible embodiment of the present disclosure, the first touch line is arranged at a side of the second touch line close to the display region, at least one of the first touch lines is a first touch access line, and a portion of the first touch access line corresponding to the notch extends along an contour of the notch: the plurality of second touch lines includes at least one second touch access line closest to the display region and a plurality of second touch peripheral lines arranged at a side of the second touch access line away from the display region; and a portion of the second touch access line corresponding to the notch extends along the contour of the notch, a portion of each of the plurality of second touch peripheral lines corresponding to the notch is not indented along the contour of the notch, and the dummy shielding pattern and/or the blank region is arranged between the second touch access line and the plurality of second touch peripheral lines.

In a possible embodiment of the present disclosure, the plurality of peripheral lines further includes a first shielding line, the first shielding line is arranged between the first touch access line and the second touch access line, and a portion of the first shielding line corresponding to the notch extends along the contour of the notch; and/or the plurality of peripheral lines further includes a second shielding line, and the second shielding line is arranged between the dummy shielding pattern and/or the blank region and the plurality of second touch peripheral lines.

In a possible embodiment of the present disclosure, a portion of each of the plurality of first touch lines and the plurality of second touch lines corresponding to the notch extends along the contour of the notch, and the dummy shielding pattern and/or the blank region is arranged at a side of the plurality of second touch lines away from the display region.

In a possible embodiment of the present disclosure, the plurality of peripheral lines further includes at least one shielding line, the shielding line is arranged between the first touch line and the second touch line, and a portion of the shielding line corresponding to the notch extends along the contour of the notch.

In a possible embodiment of the present disclosure, the touch layer at least includes at least two metal layers, patterns of the at least two metal layers at least include patterns of the first touch electrodes and the second touch electrodes, and the dummy shielding pattern is arranged at a same layer and made of a same material as at least one of the at least two metal layers.

In a possible embodiment of the present disclosure, the dummy shielding pattern includes a plurality of dummy lines arranged in parallel from one side close to the display region to one side away from the display region in an indentation direction of the notch.

In a possible embodiment of the present disclosure, lengths of at least a part of the plurality of dummy lines are different from each other to match a contour shape of the notch.

In a possible embodiment of the present disclosure, the lengths of at least a part of the plurality of dummy lines increase gradually from one side close to the display region to one side away from the display region.

In a possible embodiment of the present disclosure, when the ratio of the area of the touch pattern of the second touch unit to the area of the touch pattern of the first touch unit is greater than 0 and less than or equal to the first threshold, touch patterns of at least a part of the second touch units include real touch patterns with a touch function and dummy touch patterns decoupled from the real touch patterns, the real touch patterns are arranged at a same layer and made of a same material as the dummy touch patterns, and the real touch patterns are coupled to the second touch lines and the first touch lines, and the dummy touch patterns are decoupled from the second touch lines and the first touch lines.

In a possible embodiment of the present disclosure, the plurality of peripheral lines further includes at least one grounded line, and the grounded line is arranged at a side of the second touch line away from the display region.

In a possible embodiment of the present disclosure, when the ratio of the area of the touch pattern of the second touch unit to the area of the touch pattern of the first touch unit is greater than or equal to a second threshold and less than 100%, an outer contour of an orthogonal projection of each touch pattern of at least a part of the plurality of second touch units onto the base substrate is partially expanded to form an expanded portion.

In a possible embodiment of the present disclosure, a portion of at least one of the plurality of peripheral lines adjacent to the second touch unit corresponding to the expanded portion extends along a contour of the expanded portion: or at least a part of the plurality of peripheral lines is arranged at a layer different from the touch pattern and does not extend along the contour of the expanded portion, and an orthogonal projection of a portion of the at least a part of the plurality of peripheral lines corresponding to the expanded portion onto the base substrate partially overlaps with an orthogonal projection of the expanded portion onto the base substrate.

In a possible embodiment of the present disclosure, at least one edge corner of the touch layer is provided with two adjacent second touch units, a ratio of an area of the touch pattern of one second touch unit to the area of the touch pattern of the first touch unit is greater than 0 and less than or equal to the first threshold, and a ratio of an area of the touch pattern of the other second touch unit to the area of the touch pattern of the first touch unit is greater than or equal to the second threshold and less than 100%.

In another aspect, the present disclosure provides in some embodiments a method for manufacturing the above-mentioned touch display substrate, including: providing a base substrate; and forming a touch layer on the base substrate. The touch layer includes a plurality of touch units arranged in an array form, the plurality of touch units includes a plurality of first touch units with complete touch patterns and a plurality of second touch units with incomplete touch patterns, at least a part of the plurality of second touch units is arranged in an outer edge region of the touch layer, a ratio of an area of the touch pattern of the second touch unit to an area of the touch pattern of the first touch unit is greater than 0 and less than or equal to a first threshold, and/or greater than or equal to a second threshold and less than 100%, and the first threshold is less than the second threshold.

In yet another aspect, the present disclosure provides in some embodiments a touch display device, including: the above-mentioned touch display substrate; and a touch circuitry electrically coupled to the touch layer and configured to combine the second touch unit and an adjacent touch unit into one touch unit for touch signal transmission when the ratio of the area of the touch pattern of the second touch unit to the area of the touch pattern of the first touch unit is greater than 0 and less than or equal to the first threshold, and/or take the second touch unit as an independent touch unit for touch signal transmission when the ratio of the area of the touch pattern of the second touch unit to the area of the touch pattern of the first touch unit is greater than or equal to a second threshold and less than 100%.

In a possible embodiment of the present disclosure, the touch display device further includes a cover plate, and an edge of the cover plate is provided with a light shielding layer. An orthogonal projection of the light shielding layer onto the base substrate overlaps with the orthogonal projection of the notch onto the base substrate, and the orthogonal projection of the touch pattern of the plurality of second touch units onto the base substrate is provided with the blank region in a region corresponding to the notch: or the orthogonal projection of the light shielding layer onto the base substrate fully or partially overlaps with the orthogonal projection of the notch onto the base substrate, the touch display substrate further includes the dummy shielding pattern arranged on the base substrate, and the orthogonal projection of the dummy shielding pattern onto the base substrate is at least partially arranged in the orthogonal projection of the notch onto the base substrate.

The present disclosure has the following beneficial effects.

According to the touch display substrate, the manufacturing method thereof, and the display device in the embodiments of the present disclosure, the touch units in the touch layer include a plurality of first touch units with complete touch patterns and a plurality of second touch units with incomplete touch patterns. For the second touch units with incomplete touch patterns, the integrity of the touch pattern (i.e., the ratio of the area of the touch pattern of the second touch unit to the area of the touch pattern of the first touch unit) is specially designed, so as to enable the integrity of the touch pattern of each second touch unit to be between 0 and the first threshold, or between the second threshold and 100%. In this regard, the second touch unit where the integrity of the touch pattern is smaller than or equal to the first threshold may be combined with the adjacent touch unit into one touch unit, and the second touch unit where the integrity of the touch pattern is greater than the second threshold is taken as an independent touch unit, so as to prevent the occurrence of an abnormal touch function due to missing touch patterns when the integrity of the touch patterns is between the first threshold and the second threshold in the related art, thereby to further improve the touch function of the touch display substrate.

Figure 1:
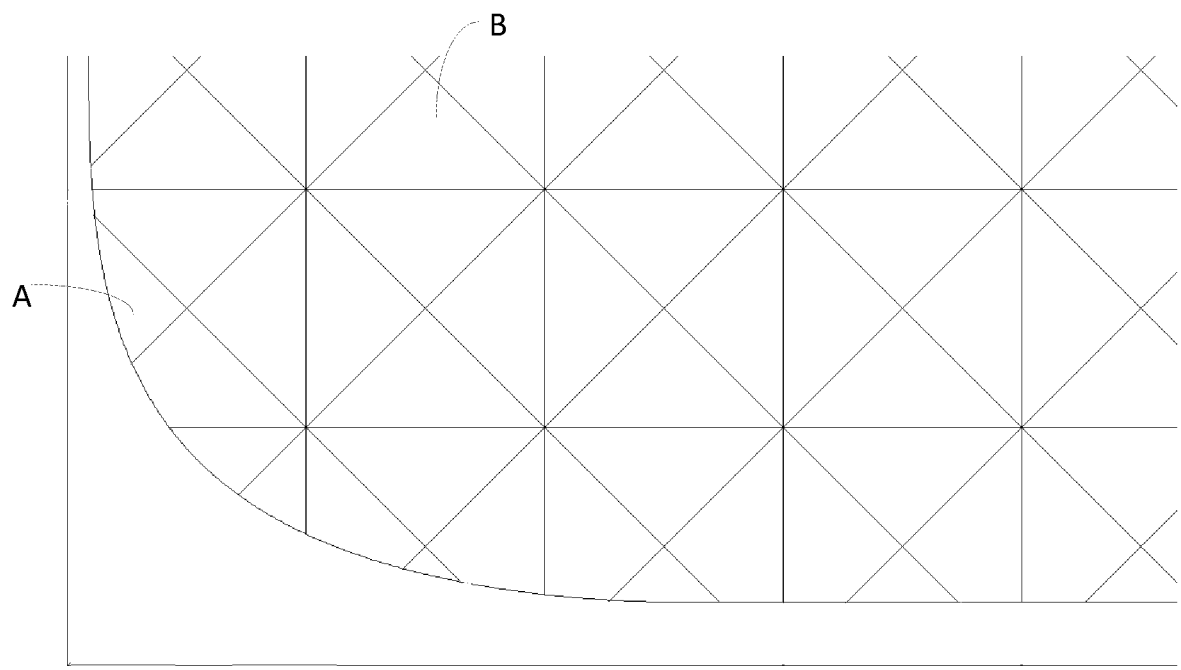
FIG. 1 is a schematic view showing a touch display product with missing touch patterns at corners in the related art.

REFERENCE SIGN LIST 1 base substrate
2 touch layer
2a first metal layer
2b second metal layer
3 peripheral line
4 light shielding layer
10 first touch unit
20 second touch unit
101 real touch pattern
102 dummy touch pattern
21 notch
201 first touch electrode
202 second touch electrode
203 first connection bridge
204 second connection bridge
22 expanded portion
31 first touch line
31a first touch access line
32 second touch line,
32a second touch access line
32b second touch peripheral line
33 shielding line
33a first shielding line
33a second shielding line
34 grounded line
35 PCD line
40 dummy shielding pattern

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Before describing the touch display substrate, the manufacturing method thereof and the touch display device in the embodiments of the present disclosure in detail, it is necessary to describe the technology in the related art.

FIG. 1 shows a touch display product with missing touch patterns at corners in the related art. For a touch display product, at a special position such as a corner, a part of the touch pattern of the touch unit is missing as compared to the normal touch pattern of the display region, i.e., the touch pattern is incomplete.

The integrity of the touch pattern refers to a ratio of an area of the incomplete touch pattern A to an area of the normal touch pattern B.

In the related art, for a touch unit with an incomplete touch pattern, e.g., a touch unit at a special position such as an edge or a corner, if the integrity is less than a first threshold (e.g., 20%), a touch Integrated Circuit (IC) merges the incomplete touch pattern into an adjacent touch unit and records a touch signal of the touch unit; and if the integrity is greater than the first threshold, the touch unit with the incomplete touch pattern is regarded as an individual touch unit, and the touch signal of the touch unit is recorded.

It is found through researches that, when the integrity of the touch pattern is between the first threshold and the second threshold (e.g., 20% to 70%) and the incomplete touch pattern is regarded as an individual touch unit, a capacitance value of the incomplete touch pattern is significantly lower than a capacitance value of the normal touch pattern, and thereby an abnormal touch function occurs at the position of the incomplete touch pattern whose integrity is between the first threshold and the second threshold. In this regard, it is necessary to compensate for the incomplete touch pattern to improve the touch function of the touch product.

An object of the present disclosure is to provide a touch display substrate, a manufacturing method thereof, and a display device, so as to improve the touch function of the touch display substrate.

Figure 2:
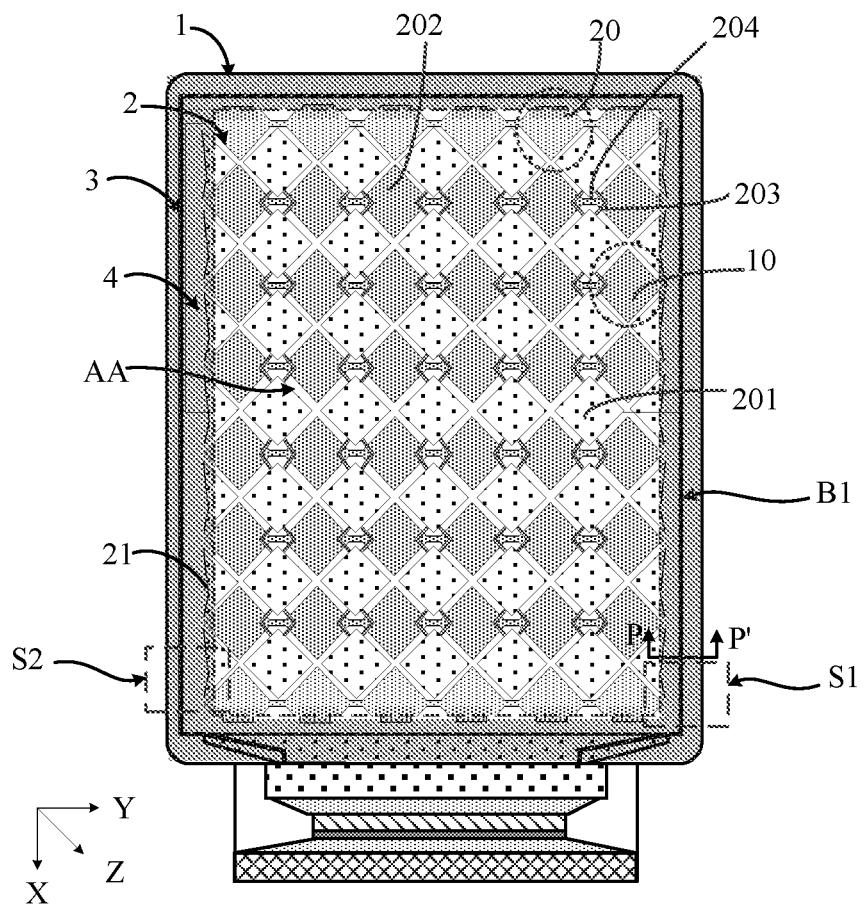
FIG. 2 is a front view of a touch display substrate according to one embodiment of the present disclosure.

As shown in FIG. 2, the touch display substrate in the embodiments of the present disclosure includes a base substrate 1 and a touch layer 2 arranged on the base substrate. The touch layer 2 includes a plurality of touch units arranged in an array form, the plurality of touch units includes a plurality of first touch units 10 with complete touch patterns and a plurality of second touch units 20 with incomplete touch patterns, at least a part of the plurality of second touch units 20 is arranged in an outer edge region of the touch layer 2, a ratio of an area of the touch pattern of the second touch unit 20 to an area of the touch pattern of the first touch unit 10 is greater than 0 and less than or equal to a first threshold, and/or greater than or equal to a second threshold and less than 100%, and the first threshold is less than the second threshold.

Based on the above, the touch units in the touch layer includes a plurality of first touch units 10 with complete touch patterns and a plurality of second touch units 20 with incomplete touch patterns. For the second touch units 20 with incomplete touch patterns, the integrity of the touch pattern (i.e., the ratio of the area of the touch pattern of the second touch unit 20 to the area of the touch pattern of the first touch unit 10) is specially designed, so as to enable the integrity of the touch pattern of each second touch unit 20 to be between 0 and the first threshold, or between the second threshold and 100%. In this regard, the second touch unit 20 where an integrity of the touch pattern is smaller than or equal to the first threshold may be combined with an adjacent touch unit into one touch unit for touch signal transmission; and the second touch unit 20 where the integrity of the touch pattern is greater than the second threshold is taken as an independent touch unit, so as to prevent the occurrence of an abnormal touch function due to the incomplete touch pattern when the integrity of the touch pattern is between the first threshold and the second threshold, thereby to further improve the touch function of the touch display substrate.

In some embodiments of the present disclosure, the first threshold is 20%, and the second threshold is 70%. It is found that, when the second touch unit 20 where the integrity of the touch pattern is less than 20% and an adjacent touch unit are combined into one touch unit and the second touch unit 20 where the integrity of the touch pattern is greater than 70% is taken as an independent touch unit, a difference between a capacitance value of the second touch unit 20 and a capacitance value of a normal touch unit 10 is within an allowable range, so it is able to improve the touch function in a better manner. Therefore, in the embodiments of the present disclosure, the first threshold is set as 20%, and the second threshold is set as 70%. It should be appreciated that, in actual use, the values of the first threshold and the second threshold may be adjusted according to the practical needs.

In some embodiments of the present disclosure, the touch pattern is a metal grid pattern or any suitable touch pattern such as a touch electrode block pattern.

Figure 3:
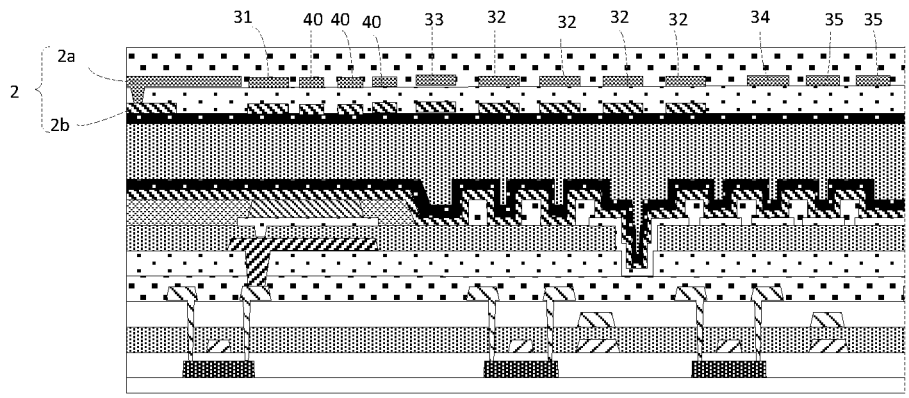
FIG. 3 is a sectional view of the touch display substrate along line P-P' in FIG. 2.

FIG. 2 is a front view of the touch display substrate in the embodiments of the present disclosure, and FIG. 3 is a sectional view of the touch display substrate along line P-P' in FIG. 2.

In some embodiments of the present disclosure, as shown in FIG. 2, the touch display substrate includes a display region AA and a peripheral region B1 surrounding the display region AA. The plurality of touch units is arranged in the display region AA, and includes a plurality of first touch electrodes 201 extending along a first direction X and arranged along a second direction Y and a plurality of second touch electrodes 202 extending along the second direction Y and arranged along the first direction X, and the first direction X crosses the second direction Y. The peripheral region B1 is provided with a plurality of peripheral lines 3, the plurality of peripheral lines 3 includes a plurality of first touch lines and a plurality of second touch lines, the first touch line is coupled to the first touch electrode 201, and the second touch line is coupled to the second touch electrode 202.

For example, when the touch pattern is a metal grid, the first touch electrode 201 is a transmission (Tx) electrode, and the second touch electrode 202 is a reception (Rx) electrode. The first touch line is a Tx line, and the second touch line is an RX line.

In addition, the touch display substrate includes a plurality of pixel units arranged in an array form, and each pixel unit includes a plurality of sub-pixels. For example, when the touch pattern is a metal grid, each grid corresponds to one or more sub-pixels.

The touch layer 2 at least includes at least two metal layers, and patterns of the at least two metal layers at least include patterns of the first touch electrodes 201 and the second touch electrodes 202.

For example, as shown in FIG. 2 and FIG. 3, the touch layer 2 includes a first metal layer 2a and a second metal layer 2b arranged between the first metal layer 2a and the base substrate, a pattern of the first metal layer 2a includes a pattern of the first touch electrode 201, a pattern of the second touch electrode 202, and a pattern of the first connection bridge 203 coupled to the first touch electrode 201. A pattern of the second metal layer 2b includes a pattern of a second connection bridge 204 coupled to the second touch electrode 202.

The plurality of peripheral lines 3 is arranged at a same layer and made of a same material as the first metal layer 2a and/or the second metal layer 2b, so as to simplify the manufacture process. For example, the pattern of the first metal layer 2a further includes a pattern of the first touch line 31 and/or a pattern of the second touch line 32 arranged in the peripheral region B1, and the pattern of the second metal layer 2b further includes the pattern of the first touch line 31 and/or the pattern of the second touch line 32 arranged in the peripheral region B1. It should be appreciated that, when the pattern of the first metal layer 2a includes both the pattern of the first touch line 31 and the pattern of the second touch line 32 and the pattern of the second metal layer 2b includes both the pattern of the first touch line 31 and the pattern of the second touch line 32, each of the first touch line 31 and the second touch line 32 is divided into two layers, so as to reduce an impedance. In addition, when the line in one layer is broken, the line in the other layer may take effect, so as to reduce the risk of damage.

In the embodiments of the present disclosure, when the outer contour of the touch pattern is partially indented, it means that the contour of the first touch electrode 201 and/or the contour of the second touch electrode 202 in the touch pattern are partially indented.

The following description will be given when the first threshold is 20% and the second threshold is 70%.

In the related art, in order to meet the requirement on a size of a product, the integrity of many incomplete touch patterns of the touch product is usually 20% to 70%. An object of the present disclosure is to compensate for the second touch unit 20 with incomplete touch pattern. A touch pattern of an incomplete touch unit with the integrity of 20% to 40% is indented, so that the integrity of the touch pattern is reduced to less than 20%; and a touch pattern of the incomplete touch unit with the integrity of 40% to 70% is expanded, so that the integrity of the touch pattern is increased to more than 70%.

In the embodiments of the present disclosure, as shown in FIG. 2, when the ratio of the area of the touch pattern of the second touch unit 20 to the area of the touch pattern of the first touch unit 10 is greater than 0 and less than or equal to the first threshold, an outer contour of an orthogonal projection of each touch pattern of at least a part of the plurality of second touch units 20 onto the base substrate 1 is partially indented to form a notch 21.

Based on the above, for the touch unit where the integrity of the touch pattern is 20% to 40% in the related art, the outer contour of the orthogonal projection of the touch pattern onto the base substrate 1 is partially indented to reduce its area, so as to reduce the integrity of the touch pattern to less than 20%. Through the partial indentation, it is able to not only reduce the area of the touch pattern to reduce the integrity of the touch pattern to less than 20%, but also prevent the main body contour of the touch pattern from being adversely affected to meet the requirement on the size of the product.

Figure 4:
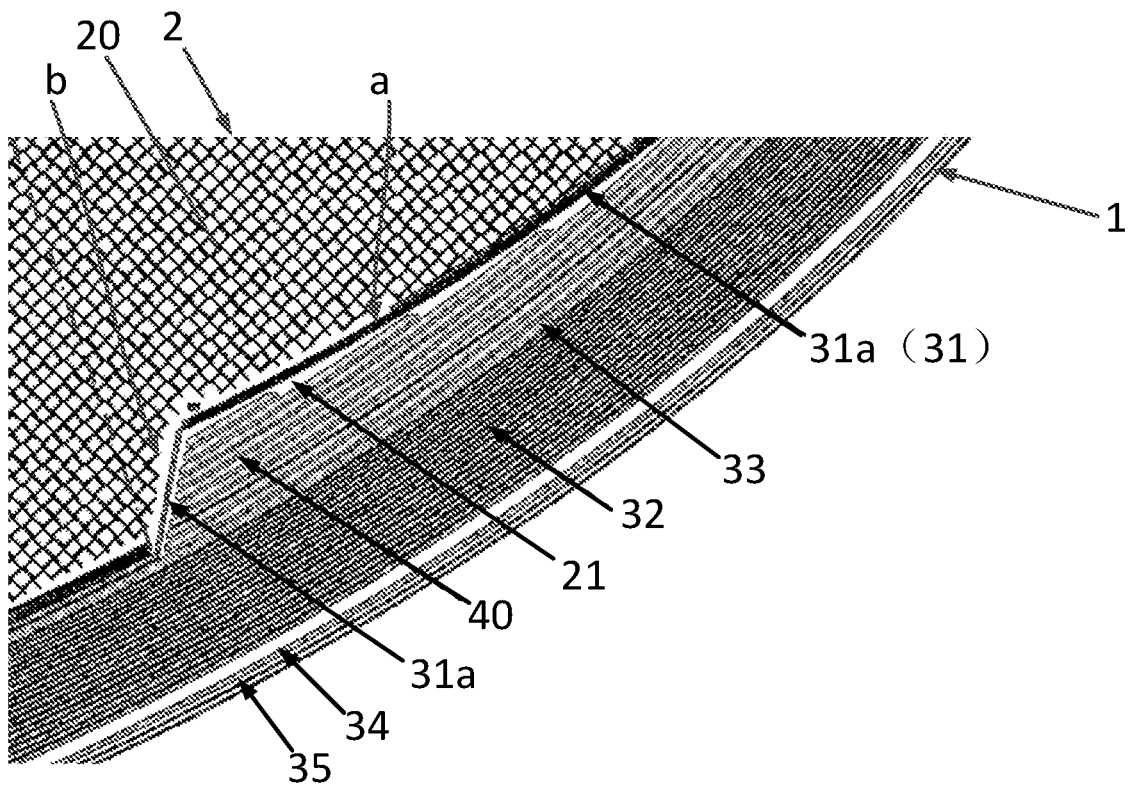
FIG. 4 is a schematic view showing touch patterns and lines at a corner position S1 in FIG. 2 according to one embodiment of the present disclosure.

In some embodiments of the present disclosure, as shown in FIG. 2 and FIG. 4, the outer contour of the orthogonal projection of each touch pattern of at least a part of the plurality of second touch units 20 onto the base substrate 1 includes a notch contour section corresponding to the notch 21 and a main body contour section other than the notch contour section, and the notch contour section includes a first end and a second end coupled to the main body contour section. The notch contour section further includes a first transition section (section a in FIG. 3) and a second transition section (section b in FIG. 3) arranged in sequence from the first end to the second end, and in a direction from the first end to the second end, an indentation of the first transition section increases gradually, and an indentation of the second transition section decreases gradually. In other words, the indentations of the notch contour sections increase gradually at first and then decrease gradually, so as to facilitate the patterning process.

It should be appreciated that, in actual use, the shape of the notch contour section is not limited thereto.

In addition, in some embodiments of the present disclosure, as shown in FIG. 4, the first transition section (section a in FIG. 4) is of a curved shape and is in smooth transition connection with the main body contour section, and the second transition section (section b in FIG. 4) is of a linear shape. In this way, it is able to prevent the general contour of the second touch unit 20 from being adversely affected as possible when the contour of the notch is indented.

It should be appreciated that, in actual use, the contour of the first transition section may also be of a linear shape, and the contour of the second transition section may also be of a curved shape.

Figure 5:
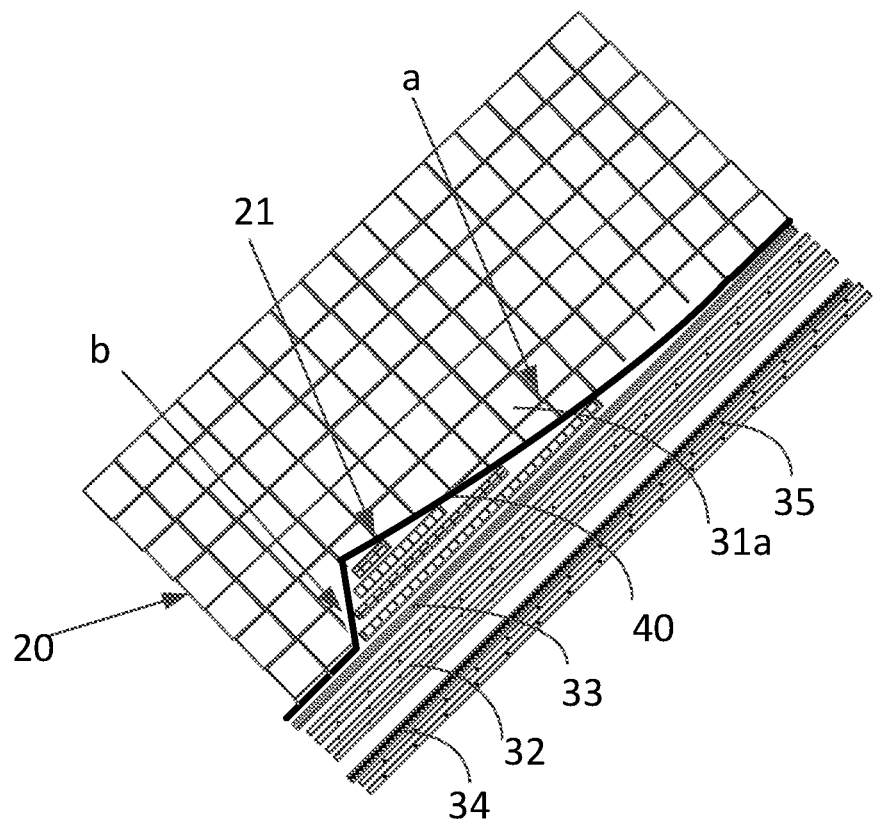
FIG. 5 is a brief schematic view showing the structure in FIG. 4.

In addition, in some embodiments of the present disclosure, as shown in FIG. 4 and FIG. 5, the touch display substrate further includes a dummy shielding pattern 40 arranged on the base substrate 1, and an orthogonal projection of the dummy shielding pattern 40 onto the base substrate 1 is at least partially arranged in an orthogonal projection of the notch 21 onto the base substrate 1.

Based on the above, the notch 21 is filled with the dummy shielding pattern 40. In this regard, on one hand, it is able to prevent the occurrence of signal interference between the touch pattern and the peripheral lines 3. On the other hand, when the dummy shielding pattern 40 is not arranged at the notch 21, e.g., for the second touch unit 20 arranged at the corner of the display substrate, a risk of light leakage may occur at the notch 21, and at this time the dummy shielding pattern 40 is used to shield light. In addition, through the dummy shielding pattern 40, it is also able to improve the etching uniformity in the patterning process.

It should be appreciated that, in some embodiments of the present disclosure, as shown in FIG. 2, the orthogonal projection of the dummy shielding pattern 40 onto the base substrate 1 completely covers the orthogonal projection of the notch 21 onto the base substrate 1, so as to achieve the light shielding effect in a blank region formed at the notch 21.

As shown in FIG. 2, the touch display substrate further includes a light shielding layer 4. For example, the touch display substrate further includes a cover plate (CG), and the light shielding layer 4 is arranged on the edge of the cover plate and surrounds the display region AA. The light shielding layer 4 is formed through any suitable method such as ink coating.

When an orthogonal projection of the light shielding layer 4 onto the base substrate 1 does not completely overlap with the orthogonal projection of the notch 21 onto the base substrate 1, the orthogonal projection of the dummy shielding pattern 40 onto the base substrate 1 completely overlap with the orthogonal projection of the notch 21 onto the base substrate 1.

In some other embodiments of the present disclosure, when the orthogonal projection of the light shielding layer 4 onto the base substrate 1 partially overlaps with the orthogonal projection of the notch 21 onto the base substrate 1, the dummy shielding pattern 40 merely overlaps with a region of the notch 21 not overlapping with the light shielding layer 4, and the dummy shielding pattern is not arranged in a region of the notch 21 overlapping with the light shielding layer 4.

In some other embodiments of the present disclosure, when the orthogonal projection of the light shielding layer 4 onto the base substrate 1 completely overlaps with the orthogonal projection of the notch 21 onto the base substrate 1 (as shown in FIG. 2), the orthogonal projection of the dummy shielding pattern 40 onto the base substrate 1 completely or partially overlaps with the orthogonal projection of the notch 21 onto the base substrate 1; or an orthogonal projection of the touch pattern of the second touch unit 20 onto the base substrate 1 is provided with a blank region C in an region of the second touch unit 20 corresponding to the notch 21. Here, the blank region C refers to a region where the dummy shielding pattern is not provided.

FIG. 4 and FIG. 5 show a partial structure S1 of the touch display substrate in the embodiments of the present disclosure. As shown in FIG. 4 and FIG. 5, the first touch line 31 is arranged at a side of the second touch line 32 close to the display region AA, and the dummy shielding pattern 40 is arranged between at least one of the first touch lines 31 and at least one of the second touch lines 32, so as to achieve a light shielding effect, improve the etching uniformity, and reduce signal interference.

In some embodiments of the present disclosure, at least one of the first touch lines 31 is a first touch access line 31a, and a portion of the first touch access line corresponding to the notch 21 extends along an contour of the notch 21: a portion of each of the plurality of second touch lines 32 corresponding to the notch 21 is not indented along the contour of the notch 21; and the dummy shielding pattern 40 is arranged between the first touch line 31 and the plurality of second touch lines 32.

Based on the above, the first touch access line 31a is indented along the contour of the notch 21 while the second touch line 32 is not indented along the contour of the notch 21, and the dummy shielding pattern 40 is filled between the first touch access line 31a and the second touch line 32. In this regard, through the dummy shielding pattern 40, it is able to achieve a light shielding effect, improve the etching uniformity of the patterning process, and reduce the signal interference between the second touch line 32 and the first touch access line 31a.

It should be appreciated that, based on the above technical solution, the first touch access line 31a is arranged at the side closest to the display region AA, so as to achieve the signal transmission with the touch pattern. For example, the technical solution is applied to the touch patterns arranged at the lower right corner of the touch display substrate (i.e. the lower right corner of the touch display substrate in an actual application scenario).

In addition, in the embodiments of the present disclosure, the plurality of peripheral lines 3 further includes at least one shielding line 33, the at least one shielding line 33 is arranged between the first touch access line 31a and the plurality of second touch lines 32 and arranged at a side of the dummy shielding pattern 40 away from the display region, and a portion of the shielding line 33 corresponding to the notch 21 is not indented along the contour of the notch 21.

Figure 6:
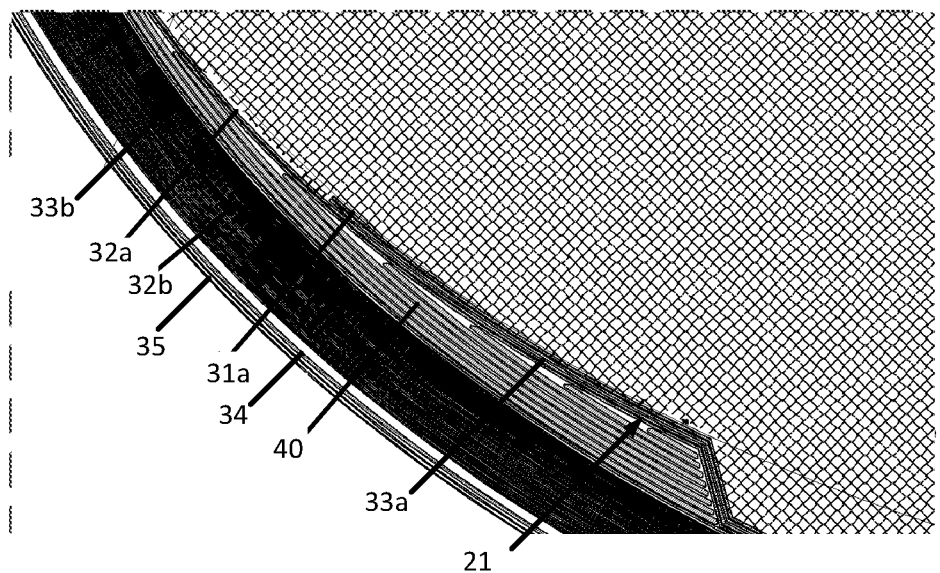
FIG. 6 is a schematic view showing touch patterns and lines at a corner position S2 in FIG. 2 according to one embodiment of the present disclosure.
Figure 7:
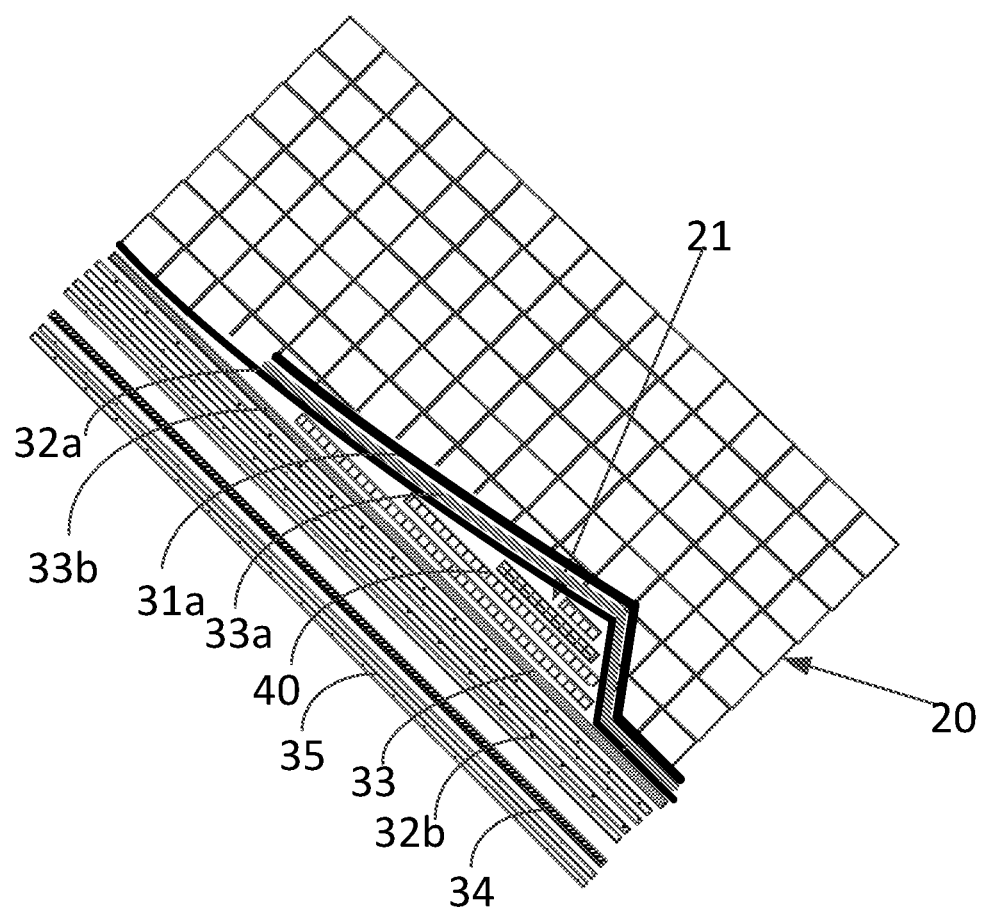
FIG. 7 is a brief schematic view showing the structure in FIG. 6.

FIG. 6 and FIG. 7 show a partial structure of S2 in the touch display substrate.

As shown in FIG. 6 and FIG. 7, in the embodiments of the present disclosure, the first touch lines 31 are arranged at a side of the second touch lines 32 close to the display region AA, at least one of the first touch lines 31 is a first touch access line 31a, and a portion of the first touch access line 31a corresponding to the notch extends along an contour of the notch 21. The plurality of second touch lines 32 includes at least one second touch access line 32a closest to the display region AA and a plurality of second touch peripheral lines 32b arranged at a side of the second touch access line 32a away from the display region. A portion of the second touch access line 32a corresponding to the notch 21 extends along the contour of the notch 21, a portion of the plurality of second touch peripheral lines 32b corresponding to the notch 21 is not indented along the contour of the notch 21, and the dummy shielding pattern 40 is arranged between the second touch access line 32a and the plurality of second touch peripheral lines 32b.

Based on the above, the first touch access line 31a and the second touch access line 32a are indented along the contour of the notch 21 while the second touch peripheral line 32b is not indented along the contour of the notch 21, and the dummy shielding pattern 40 is filled between the second touch access line 32a and the second touch peripheral line 32b. In this regard, through the dummy shielding pattern 40, it is able to achieve a light shielding effect, improve the etching uniformity of the patterning process, and reduce the signal interference between the first touch access line 31a, the second touch access line 32a and the second touch peripheral line 32b.

It should be appreciated that, based on the above, the first touch access line 31a is arranged at the side closest to the display region AA, and the second touch access line 32a needs to achieve the signal transmission with the touch pattern arranged close to the edge of the display region AA. The technical solution is applied to the touch patterns arranged at the lower left corner of the touch display substrate (i.e. the lower left corner of the touch display substrate in an actual application scenario).

In the embodiments of the present disclosure, as shown in FIG. 6 and FIG. 7, the plurality of peripheral lines 3 further includes a first shielding line 33a, the first shielding line 33a is arranged between the first touch access line 31a and the second touch access line 32a, and a portion of the first shielding line 33a corresponding to the notch 21 extends along the contour of the notch 21. Through the first shielding line 33a, it is able to reduce the signal interference between the first touch access line 31a and the second touch access line 32a.

In the embodiments of the present disclosure, as shown in FIG. 6 and FIG. 7, the plurality of peripheral lines 3 further includes a second shielding line 33b, and the second shielding line 33b is arranged between the dummy shielding pattern and the second touch access line 32a. Through the second shielding line 33b, it is able to further reduce the signal interference.

Figure 11:
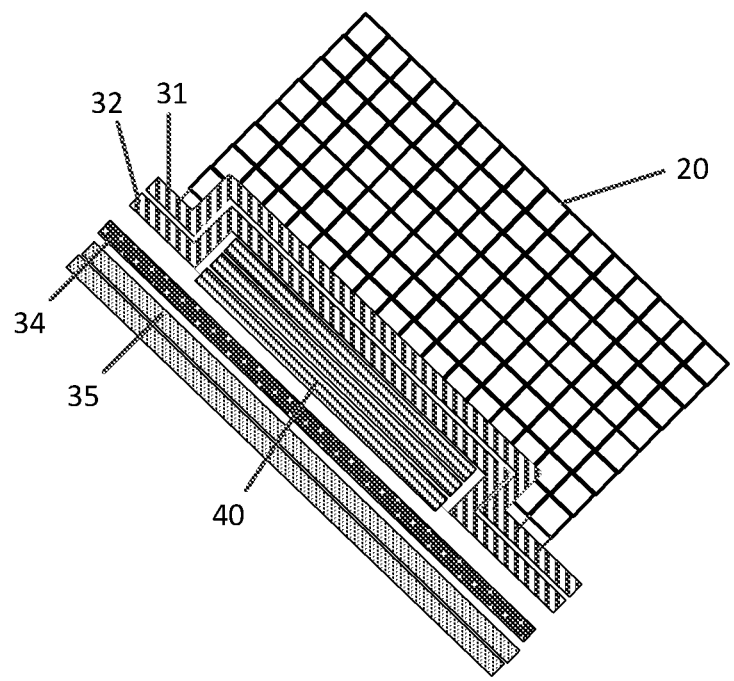
FIG. 11 is a schematic view showing touch patterns and lines of a second touch unit in the touch display substrate according to one embodiment of the present disclosure.

FIG. 11 shows another touch display substrate according to one embodiment of the present disclosure.

As shown in FIG. 11, a portion of each of the plurality of first touch lines 31 and the plurality of second touch lines 32 corresponding to the notch 21 extends along the contour of the notch 21, and the dummy shielding pattern 40 is arranged at a side of the plurality of second touch lines 32 away from the display region and is not indented along the contour of the notch 21. Based on the above, the plurality of peripheral lines 3 including the second touch peripheral lines 32b and the second touch access lines 32a may be indented along the contour of the notch 21.

It should be appreciated that, in FIG. 11, the contour of the notch 21 is straightly curved. However, in actual use, the contour of notch 21 may include the first transition section and the second transition section as shown in FIG. 3 and FIG. 4.

In the embodiments of the present disclosure, the plurality of peripheral lines 3 further includes at least one shielding line 33, the shielding line 33 is arranged between the first touch line 31 and the second touch line 32, and a portion of the shielding line 33 corresponding to the notch 21 extends along the contour of the notch 21.

It should be appreciated that, in FIG. 3, FIG. 7 and FIG. 11, the plurality of peripheral lines 3 further includes at least one grounded line (GND) 34, and the grounded line 34 is arranged at a side of the second touch line 32 away from the display region. The grounded line 34 is not designed to be indented along the contour of the notch 21 due to a sufficient distance between the grounded line 34 and the second touch line 32.

In addition, in FIG. 3, the plurality of peripheral lines 3 further includes two crack detection (PCD) lines 35 arranged at a side of the grounded line 34 away from the display region AA, and the PCD lines 35 is not indented along the contour of the notch 21.

It should be appreciated that, the touch layer 2 at least includes at least two metal layers, and the dummy shielding pattern is arranged at a same layer and made of a same material as at least one of the at least two metal layers.

In the embodiments of the present disclosure, the wiring mode of the peripheral lines 3 has been illustratively described hereinabove when the orthogonal projection of the notch 21 onto the base substrate is provided with the dummy shielding pattern 40. In some other embodiments of the present disclosure, the dummy shielding pattern is not provided, i.e., the orthogonal projection of the touch pattern of the second touch unit onto the base substrate is provided with the blank region in a region corresponding to the notch 21, and the wiring mode of the peripheral lines 3 may be the same.

Figure 10:
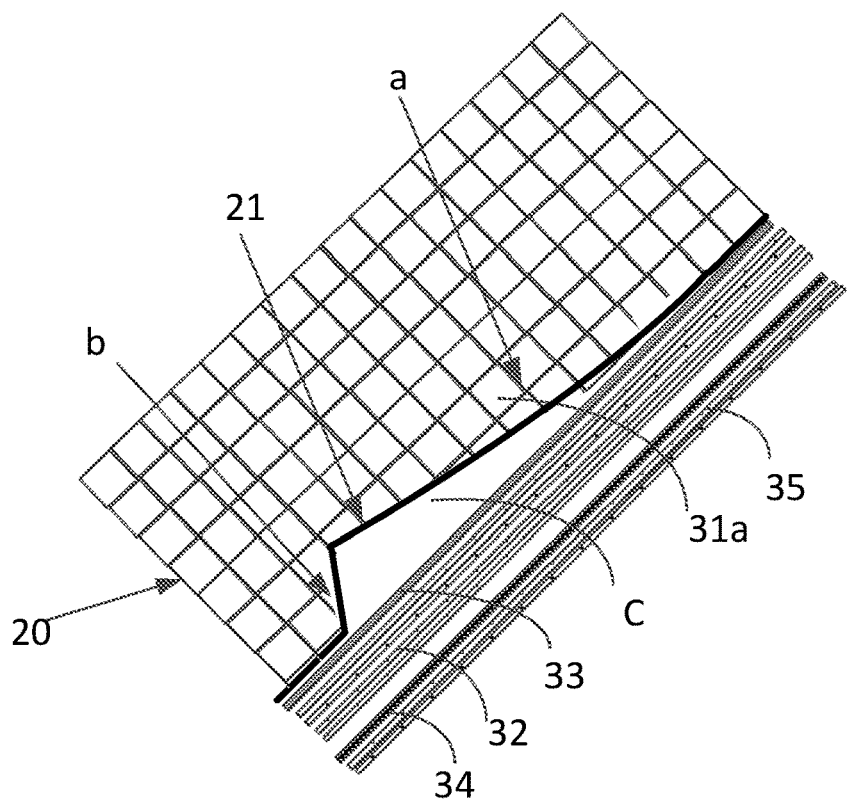
FIG. 10 is another schematic view showing the touch patterns and lines at the corner position S1 in FIG. 2 according to one embodiment of the present disclosure.

For example, as shown in FIG. 10, in some embodiments of the present disclosure, the first touch line 31 is arranged at a side of the second touch line 32 close to the display region AA, and the blank region C is arranged between at least one of the first touch lines 31 and at least one of the second touch lines 32. For example, at least one of the first touch lines 31 is a first touch access line 31a, and a portion of the first touch access line 31a corresponding to the notch 21 extends along an contour of the notch 21: a portion of the plurality of second touch lines 32 corresponding to the notch 21 is not indented along the contour of the notch 21; and the blank region C is arranged between the first touch access line 31a and the plurality of second touch lines 32. In the embodiments of the present disclosure, the plurality of peripheral lines 3 further includes at least one shielding line 33, the at least one shielding line 33 is arranged between the first touch access line 31a and the plurality of second touch lines 32 and arranged at a side of the blank region C away from the display region, and a portion of the shielding line 33 corresponding to the notch 21 is not indented along the contour of the notch 21.

Figure 8:
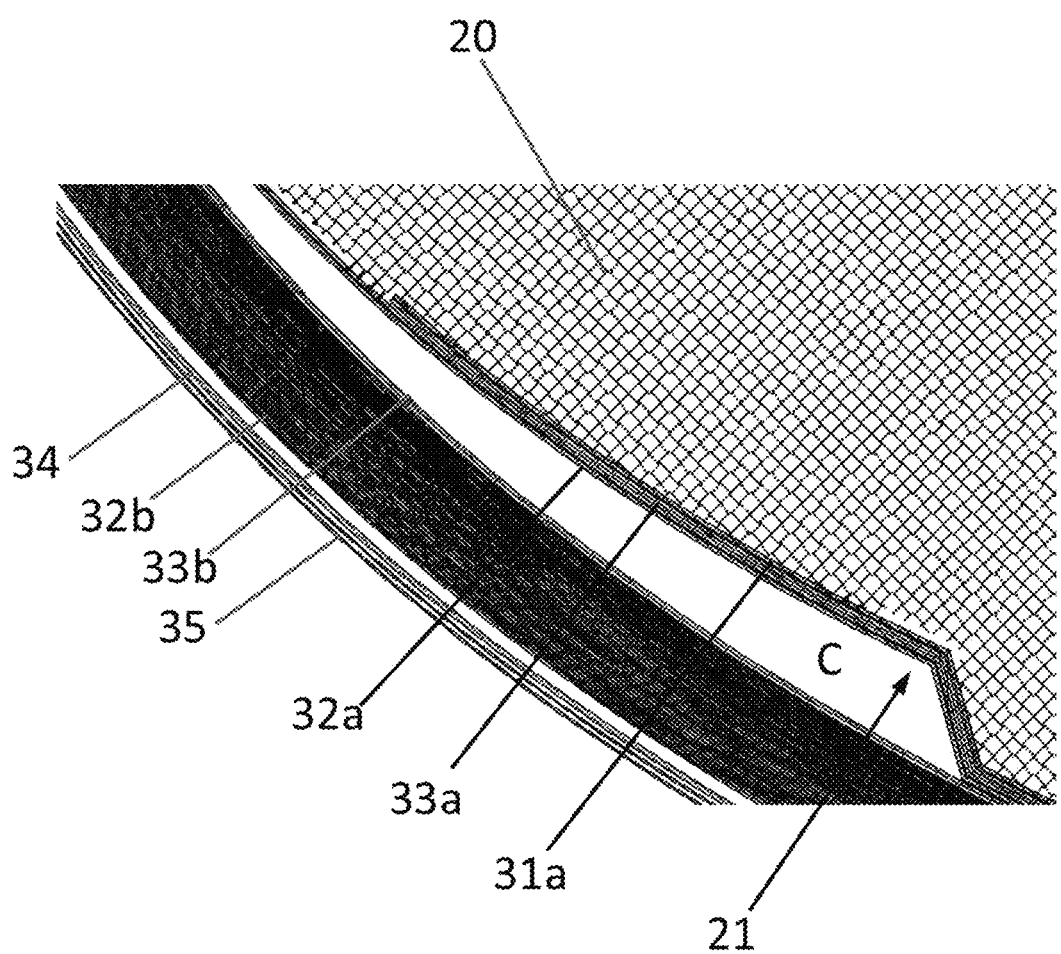
FIG. 8 is another schematic view showing the touch patterns and lines at the corner position S2 in FIG. 2 according to one embodiment of the present disclosure.
Figure 9:
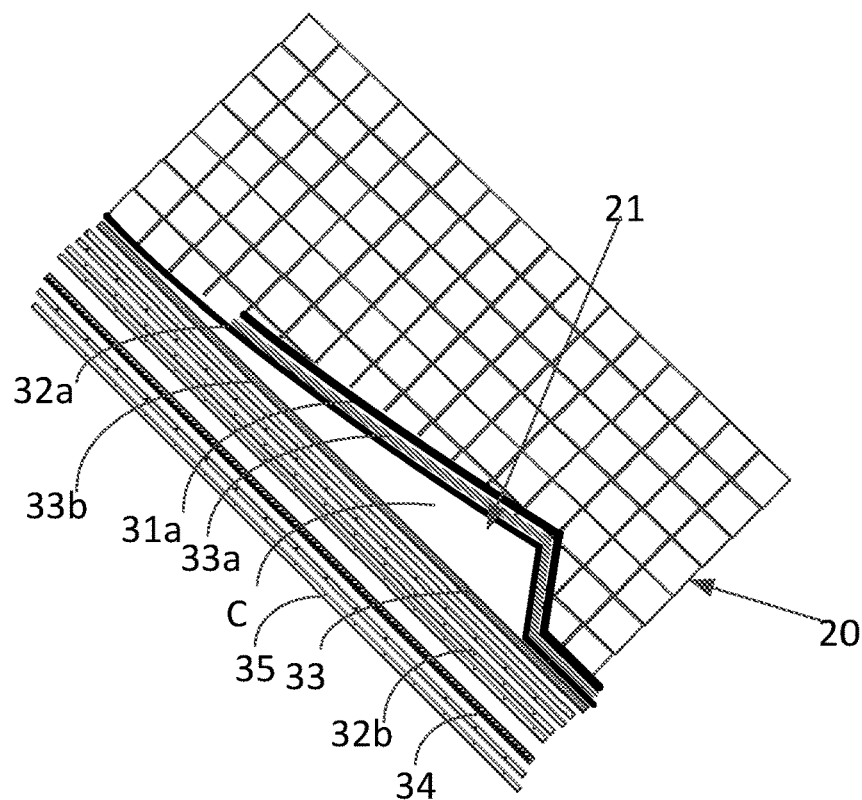
FIG. 9 is a brief schematic view showing the structure in FIG. 8.

For example, as shown in FIG. 8 and FIG. 9, in some other embodiments of the present disclosure, the first touch lines 31 are arranged at a side of the second touch lines 32 close to the display region AA, at least one of the first touch lines 31 is a first touch access line 31a, and a portion of the first touch access line 31a corresponding to the notch 21 extends along an contour of the notch 21: the plurality of second touch lines 32 includes at least one second touch access line 32a closest to the display region AA and a plurality of second touch peripheral lines arranged 32b at a side of the second touch access line 32a away from the display region AA; and a portion of the second touch access line 32a corresponding to the notch 21 extends along the contour of the notch 21, a portion of the plurality of second touch peripheral lines 32b corresponding to the notch 21 is not indented along the contour of the notch 21, and the blank region C is arranged between the second touch access line 32a and the plurality of second touch peripheral lines 32b.

As shown in FIG. 8 and FIG. 9, in the embodiments of the present disclosure, the plurality of peripheral lines 3 further includes a first shielding line 33a, the first shielding line 33a is arranged between the first touch access line 31a and the second touch access line 32a, and a portion of the first shielding line 33a corresponding to the notch 21 extends along the contour of the notch 21; and/or the plurality of peripheral lines 3 further includes a second shielding line 33b, and the second shielding line 33b is arranged between the dummy shielding pattern and/or the blank region C and the plurality of second touch peripheral lines 32b. Through the first shielding line 33a and/or the second shielding line 33b, it is able to reduce the signal interference between the first touch access line 31a and the second touch access line 32a.

Figure 12:
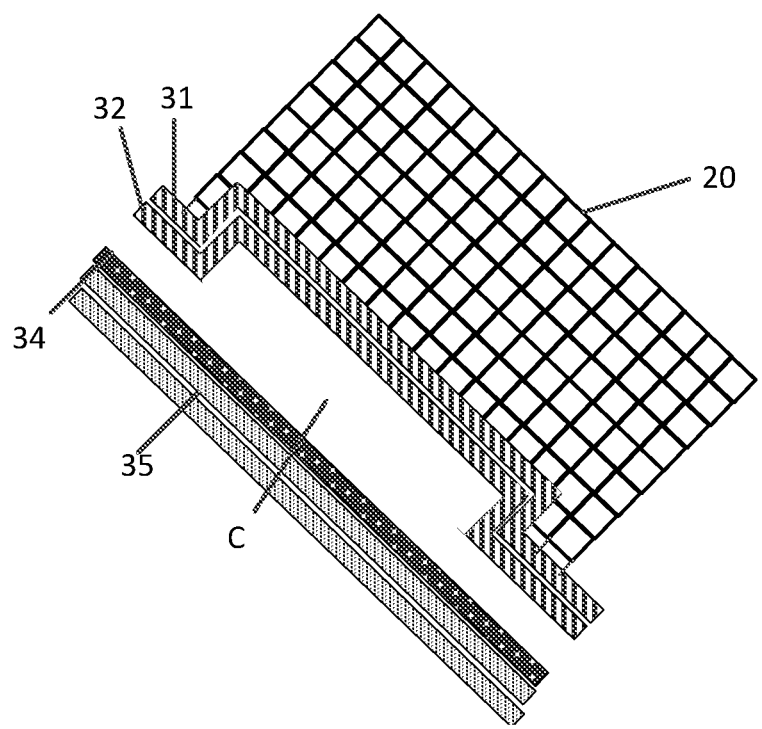
FIG. 12 is another schematic view showing the touch patterns and lines of the second touch unit in the touch display substrate according to one embodiment of the present disclosure.

FIG. 12 shows yet another structure of the touch display substrate according to one embodiment of the present disclosure. As shown in FIG. 12, a portion of each of the plurality of first touch lines 31 and the plurality of second touch lines 32 corresponding to the notch 21 extends along the contour of the notch 21, and the blank region C is arranged at a side of the plurality of second touch lines 32 away from the display region AA. Here, the peripheral lines 3 may be designed to be indented along the contour of the notch 21.

In the embodiments of the present disclosure, the plurality of peripheral lines 3 further includes at least one shielding line 33, the shielding line 33 is arranged between the first touch line 31 and the second touch line 32, and a portion of the shielding line 33 corresponding to the notch 21 extends along the contour of the notch 21.

It should be appreciated that, in FIG. 8 to FIG. 12, the plurality of peripheral lines 3 further includes at least one grounded line 34, and the grounded line 34 is arranged at a side of the second touch line 32 away from the display region. The grounded line 34 is not be designed to be indented along the contour of the notch 21 due to a sufficient distance between the grounded line 34 and the second touch line 32.

In addition, in FIG. 4 to FIG. 7, the dummy shielding pattern 40 includes a plurality of dummy lines arranged in parallel from inside to outside in an indentation direction of the notch 21. In this regard, the dummy shielding pattern 40 includes a plurality of dummy lines arranged in parallel from inside to outside, so as to reduce signal interference in a better manner and ensure the etching uniformity of the dummy shielding pattern 40. It should be appreciated that, in actual use, the dummy shielding pattern 40 is not limited to the above pattern.

In addition, for example, lengths of at least a part of the plurality of dummy lines are different from each other to match a contour shape of the notch 21. That is, through designing the length of each dummy line, the lengths of the dummy lines may change stepwise along with the contour shape of the notch 21, so as to match the contour shape of the notch 21, thereby to fill the notch 21 in a better manner. In FIG. 4 to FIG. 7, the lengths of at least a part of the plurality of dummy lines increase gradually from inside to outside. It should be appreciated that, the above is for illustrative purposes only, and in actual use, the design of the lengths of the plurality of dummy lines is not limited thereto.

In addition, in the embodiments of the present disclosure, the area of the incomplete touch pattern is reduced through indenting the outer contour of the incomplete touch pattern to compensate for the touch pattern with the integrity less than 20%. The present disclosure further provides in some embodiments another compensation scheme for the touch pattern with the integrity less than 20%.

Figure 13:
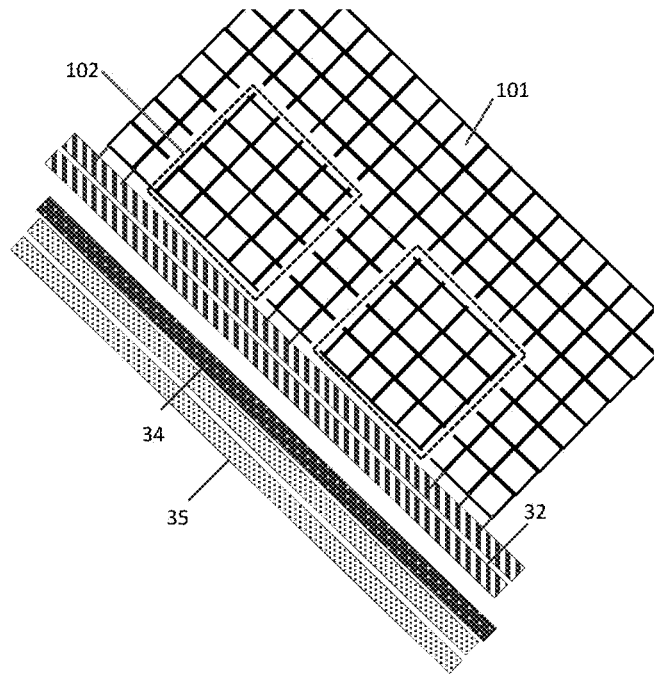
FIG. 13 is yet another schematic view showing the touch patterns and lines of the second touch unit in the touch display substrate according to one embodiment of the present disclosure.
Figure 14:
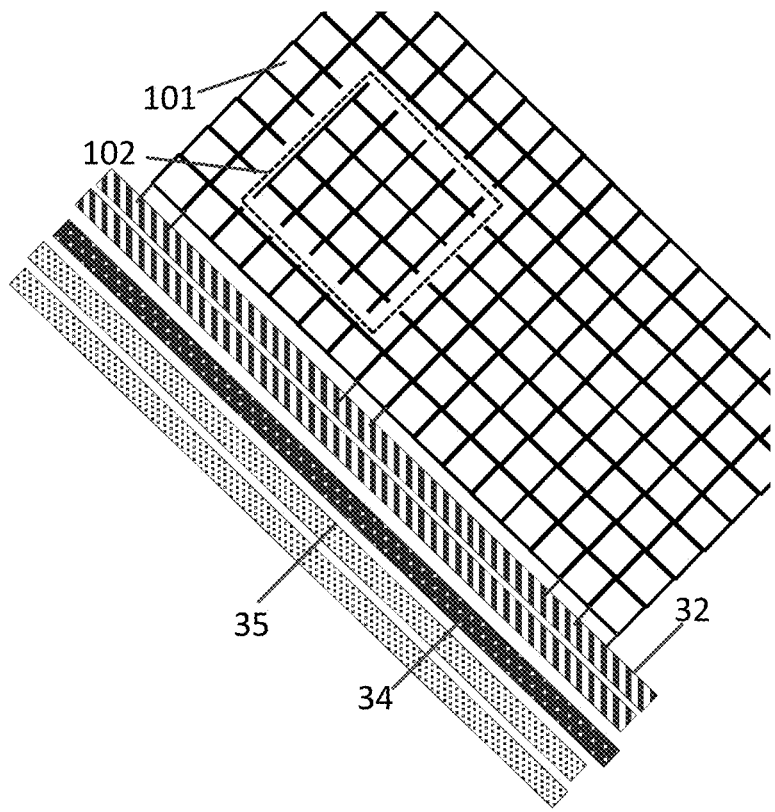
FIG. 14 is still yet another schematic view showing the touch patterns and lines of the second touch unit in the touch display substrate according to one embodiment of the present disclosure.

As shown in FIG. 13 and FIG. 14, for example, when the ratio of the area of the touch pattern of the second touch unit 20 to the area of the touch pattern of the first touch unit 10 is greater than 0 and less than or equal to 20%, touch patterns of at least a part of the second touch units 20 include real touch patterns 101 with a touch function and dummy touch patterns 102 decoupled from the real touch patterns, and the real touch patterns 101 are arranged at a same layer and made of a same material as the dummy touch patterns 102.

Based on the above, when the second touch unit 20 is patterned, a part of the touch pattern may be designed into a dummy touch pattern (Floating Dummy Mesh) and a real touch pattern. The real touch pattern is coupled to a peripheral touch signal line (i.e., the second touch line 32 and the first touch line 31) to achieve the touch function. The dummy touch pattern is not coupled to the peripheral touch signal line, and has no touch function. In this regard, it is able to ensure the etching uniformity of the touch pattern in the display region AA, and meanwhile it is unnecessary to indent the outer contour of the touch pattern so as to enable the outer contour to match a size of the product.

In addition, it should be appreciated that, the dummy touch pattern may be arranged at a side of the real touch pattern farthest away from the display region (as shown in FIG. 13), or may be arranged in the middle of the real touch pattern.

As shown in FIG. 13, in some embodiments of the present disclosure, when the dummy touch pattern 102 is arranged at the side of the real touch pattern 101 farthest away from the display region, the dummy touch pattern 102 is decoupled from the real touch pattern 101, i.e., the touch signal lines of the dummy touch pattern 102 is decoupled from the touch signal lines of the real touch pattern 101, so the plurality of touch signal lines in the real touch pattern 101 decoupled from the dummy touch pattern 102 is not coupled to the peripheral touch signal lines (as shown in FIG. 5), but coupled to the peripheral touch signal line 31 through the touch signal lines in the real touch pattern other than the plurality of touch signal lines decoupled from the dummy touch pattern 102.

As shown in FIG. 14, in some other embodiments of the present disclosure, when the dummy touch pattern 102 is arranged in the middle of the real touch pattern 101, the dummy touch pattern 102 is decoupled from the real touch pattern 101, i.e., the touch signal lines of the dummy touch pattern 102 are decoupled from the touch signal lines of the real touch pattern 101. However, the real touch pattern 101 is closest to the peripheral touch signal lines. In this regard, the touch signal line decoupled from the dummy touch signal line and arranged at the side farthest away from the display region in the real touch signal lines may still be coupled to the peripheral touch signal line 31.

In addition, in the embodiments of the present disclosure, the area of the incomplete touch pattern is reduced through indenting the outer contour of the incomplete touch pattern to compensate for the touch pattern with the integrity less than 20%. The present disclosure further provides in some embodiments a compensation scheme for extending the touch pattern of the incomplete touch control unit with the integrity of 40% to 70%, so as to increase the integrity to more than 70%.

Figure 15:
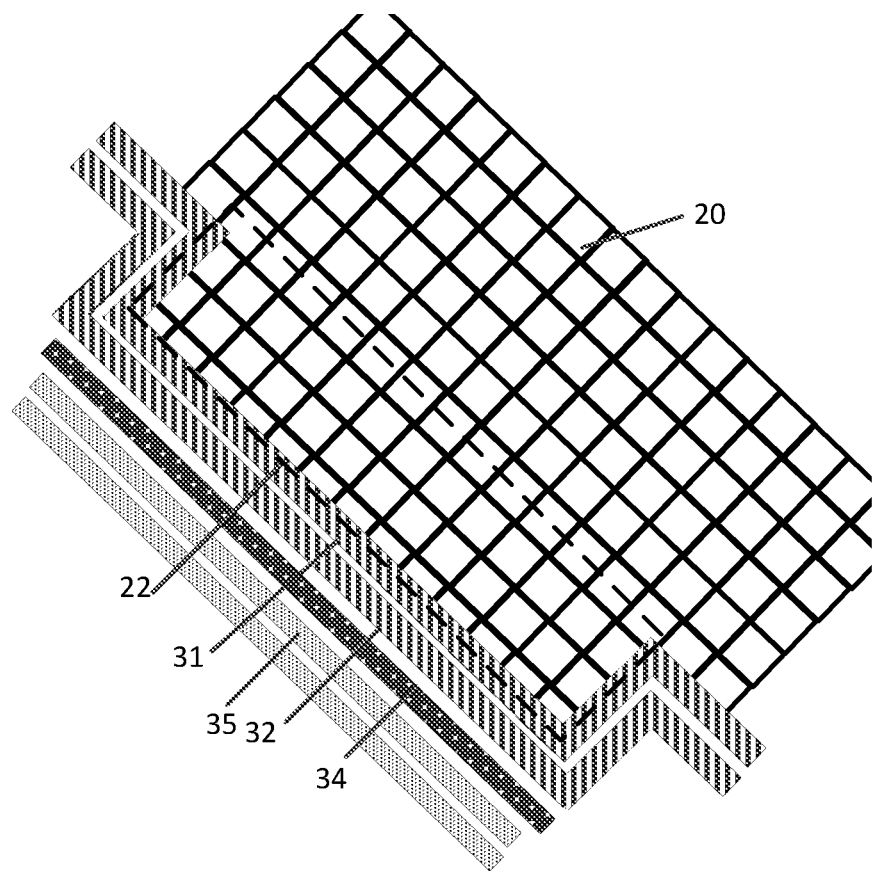
FIG. 15 is still yet another schematic view showing the touch patterns and lines of the second touch unit in the touch display substrate according to one embodiment of the present disclosure.

In the embodiments of the present disclosure, as shown in FIG. 15, when the ratio of the area of the touch pattern of the second touch unit 20 to the area of the touch pattern of the first touch unit 10 is greater than or equal to a second threshold and less than 100%, an outer contour of an orthogonal projection of the touch pattern of at least a part of the plurality of second touch units 20 onto the base substrate 1 is partially expanded to form an expanded portion 22.

Based on the above, for the touch unit where the integrity of the touch pattern is 40% to 70% in the related art, the outer contour of the orthogonal projection of the touch pattern onto the base substrate 1 is partially extended to increase its area, so as to increase the integrity of the touch pattern to more than 70%. Through the partial expansion, it is able to not only increase the area of the touch pattern to increase the integrity of the touch pattern to more than 70%, but also prevent the main body contour of the touch pattern from being adversely affected, thereby to meet the requirement on the size of the actual product.

In some embodiments of the present disclosure, as shown in FIG. 15, a portion of at least one of the plurality of peripheral lines 3 adjacent to the second touch unit 20 corresponding to the expanded portion extends along a contour of the expanded portion 22.

Based on the above, after the contour of the touch pattern of the second touch unit 20 is partially expanded, the peripheral lines 3 may be designed to follow the shape of the contour of the touch pattern.

In some other embodiments of the present disclosure, at least a part of the plurality of peripheral lines 3 is arranged at a layer different from the touch pattern and does not extend along the contour of the expanded portion 22, and an orthogonal projection of a portion of the at least a part of the plurality of peripheral lines corresponding to the expanded portion 22 onto the base substrate partially overlaps with an orthogonal projection of the expanded portion 22 onto the base substrate.

In addition, in the embodiments of the present disclosure, at least one edge corner of the touch layer 2 is provided with two adjacent second touch units 20, a ratio of an area of the touch pattern of one second touch unit 20 to the area of the touch pattern of the first touch unit 10 is greater than 0 and less than or equal to the first threshold, and a ratio of an area of the touch pattern of the other second touch unit 20 to the area of the touch pattern of the first touch unit 10 is greater than or equal to the second threshold and less than 100%.

In addition, the present disclosure further provides in some embodiments a method for manufacturing the above-mentioned touch display substrate, which includes: Step S01 of providing a base substrate 1; and Step S02 of forming a touch layer 2 on the base substrate 1. The touch layer 2 includes a plurality of touch units arranged in an array form, the plurality of touch units includes a plurality of first touch units 10 with complete touch patterns and a plurality of second touch units 20 with incomplete touch patterns, at least a part of the plurality of second touch units 20 is arranged in an outer edge region of the touch layer 2, a ratio of an area of the touch pattern of the second touch unit 20 to an area of the touch pattern of the first touch unit 10 is greater than 0 and less than or equal to a first threshold, and/or greater than or equal to a second threshold and less than 100%, and the first threshold is less than the second threshold.

The touch units in the touch layer includes a plurality of first touch units 10 with complete touch patterns and a plurality of second touch units 20 with incomplete touch patterns. For the second touch units 20 with incomplete touch patterns, the integrity of the touch pattern (i.e., the ratio of the area of the touch pattern of the second touch unit 20 to the area of the touch pattern of the first touch unit 10) is specially designed, so as to enable the integrity of the touch pattern of each second touch unit 20 to be between 0 and the first threshold, or between the second threshold and 100%. In this regard, the second touch unit 20 where an integrity of the touch pattern is smaller than or equal to the first threshold may be combined with an adjacent touch unit into one touch unit for touch signal transmission; and the second touch unit 20 where the integrity of the touch pattern is greater than the second threshold is taken as an independent touch unit, so as to prevent the occurrence of an abnormal touch function due to the incomplete touch pattern when the integrity of the touch pattern is between the first threshold and the second threshold, thereby to further improve the touch function of the touch display substrate.

For example, the dummy shielding pattern 40 and the first metal layer 2a and/or the second metal layer 2b are formed through a single patterning process. The patterning process includes exposure, development and etching. As compared with a conventional touch display substrate, it is merely necessary to improve an aperture pattern of a mask without any additional process.

For example, the dummy touch pattern 102 and the real touch pattern 101 are formed through a single patterning process. The patterning process includes exposure, development and etching. As compared with a conventional touch display substrate, it is merely necessary to improve an aperture pattern of a mask without any additional process.

In addition, the present disclosure further provides in some embodiment a touch display device, which includes: the above-mentioned touch display substrate; and a touch circuitry electrically coupled to the touch layer 2. The touch circuitry is configured to combine the second touch unit 20 and a touch unit adjacent thereto into one touch unit for touch signal transmission when the ratio of the area of the touch pattern of the second touch unit 20 to the area of the touch pattern of the first touch unit 10 is greater than 0 and less than or equal to the first threshold; and/or the touch circuitry is configured to take the second touch unit 20 as an independent touch unit for touch signal transmission when the ratio of the area of the touch pattern of the second touch unit 20 to the area of the touch pattern of the first touch unit 10 is greater than or equal to a second threshold and less than 100%.

Based on the above, for the second touch units 20 with incomplete touch patterns, the integrity of the touch pattern (i.e., the ratio of the area of the touch pattern of the second touch unit 20 to the area of the touch pattern of the first touch unit 10) is specially designed, so as to enable the integrity of the touch pattern of each second touch unit 20 to be between 0 and the first threshold, or between the second threshold and 100%. In this regard, the second touch unit 20 where an integrity of the touch pattern is smaller than or equal to the first threshold may be combined with an adjacent touch unit into one touch unit for touch signal transmission; and the second touch unit 20 where the integrity of the touch pattern is greater than the second threshold is taken as an independent touch unit, so as to prevent the occurrence of an abnormal touch function due to the incomplete touch pattern when the integrity of the touch pattern is between the first threshold and the second threshold, thereby to further improve the touch function of the touch display substrate.

In the embodiments of the present disclosure, the touch display device further includes a cover plate, and an edge of the cover plate is provided with a light shielding layer 4. An orthogonal projection of the light shielding layer 4 onto the base substrate overlaps with the orthogonal projection of the notch onto the base substrate, and the orthogonal projection of the touch pattern of the plurality of second touch units onto the base substrate is provided with the blank region C in a region corresponding to the notch: or an orthogonal projection of the light shielding layer 4 onto the base substrate fully or partially overlaps with the orthogonal projection of the notch onto the base substrate, the touch display substrate further includes the dummy shielding pattern arranged on the base substrate, and the orthogonal projection of the dummy shielding pattern onto the base substrate is at least partially arranged in the orthogonal projection of the notch onto the base substrate.

Some description will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch display substrate, comprising a base substrate and a touch layer arranged on the base substrate, wherein the touch layer comprises a plurality of touch units arranged in an array form, the plurality of touch units comprises a plurality of touch units with complete touch patterns, known as first touch units, and a plurality of touch units with incomplete touch patterns, known as second touch units, at least a part of the plurality of second touch units is arranged in an outer edge region of the touch layer, a ratio of an area of the touch pattern of one of the plurality of the second touch units to an area of the touch pattern of one of the plurality of the first touch units is greater than 0 and less than or equal to a first threshold, and/or greater than or equal to a second threshold and less than 100%, and the first threshold is less than the second threshold, wherein the touch display substrate further comprises a display region and a peripheral region surrounding the display region, wherein the plurality of touch units is arranged in the display region and comprises a plurality of first touch electrodes extending along a first direction and arranged along a second direction, and a plurality of second touch electrodes extending along the second direction and arranged along the first direction, and the first direction crosses the second direction, wherein the peripheral region is provided with a plurality of peripheral lines, the plurality of peripheral lines comprises a plurality of first touch lines and a plurality of second touch lines, the first touch line is coupled to the first touch electrode, and the second touch line is coupled to the second touch electrode, and wherein when the ratio of the area of the touch pattern of one of the plurality of the second touch units to the area of the touch pattern of one of the plurality of the first touch units is greater than 0 and less than or equal to the first threshold, an outer contour of an orthogonal projection of each touch pattern of at least a part of the plurality of second touch units onto the base substrate is partially indented to form a notch.

2. The touch display substrate according to claim 1, wherein the first threshold is 20% and/or the second threshold is 70%.

3. The touch display substrate according to claim 1, wherein the outer contour of the orthogonal projection of each touch pattern of at least a part of the plurality of second touch units onto the base substrate comprises a notch contour section corresponding to the notch and a main body contour section other than the notch contour section, the notch contour section comprises a first end and a second end coupled to the main body contour section, the notch contour section further comprises a first transition section and a second transition section in sequence from the first end to the second end, and in a direction from the first end to the second end, an indentation of the first transition section increases gradually, and an indentation of the second transition section decreases gradually.

4. The touch display substrate according to claim 3, wherein the first transition section is of a curved shape and is in smooth transition connection with the main body contour section.

5. The touch display substrate according to claim 3, wherein the second transition section is of a linear shape.

6. The touch display substrate according to claim 1, wherein the orthogonal projection of each touch pattern of at least a part of the plurality of second touch units onto the base substrate is provided with a blank region in a region corresponding to the notch; and/or the touch display substrate further comprises a dummy shielding pattern arranged on the base substrate, and an orthogonal projection of the dummy shielding pattern onto the base substrate is at least partially arranged in an orthogonal projection of the notch onto the base substrate.

7. The touch display substrate according to claim 6, wherein the first touch line is arranged at a side of the second touch line close to the display region, and the dummy shielding pattern and/or the blank region is arranged between at least one of the first touch lines and at least one of the second touch lines, wherein at least one of the first touch lines is a first touch access line, and a portion of the first touch access line corresponding to the notch extends along an contour of the notch; a portion of each of the plurality of second touch lines corresponding to the notch is not indented along the contour of the notch; and the dummy shielding pattern and/or the blank region is arranged between the first touch access line and the plurality of second touch lines, and wherein the plurality of peripheral lines further comprises at least one shielding line arranged between the first touch access line and the plurality of second touch lines and arranged at a side of the dummy shielding pattern and/or the blank region away from the display region, and a portion of the shielding line corresponding to the notch is not indented along the contour of the notch.

8. The touch display substrate according to claim 6, wherein the first touch line is arranged at a side of the second touch line close to the display region, at least one of the first touch lines is a first touch access line, and a portion of the first touch access line corresponding to the notch extends along an contour of the notch; the plurality of second touch lines comprises at least one second touch access line closest to the display region and a plurality of second touch peripheral lines arranged at a side of the second touch access line away from the display region; and a portion of the second touch access line corresponding to the notch extends along the contour of the notch, a portion of each of the plurality of second touch peripheral lines corresponding to the notch is not indented along the contour of the notch, and the dummy shielding pattern and/or the blank region is arranged between the second touch access line and the plurality of second touch peripheral lines, and wherein the plurality of peripheral lines further comprises a first shielding line, the first shielding line is arranged between the first touch access line and the second touch access line, and a portion of the first shielding line corresponding to the notch extends along the contour of the notch; and/or the plurality of peripheral lines further comprises a second shielding line, and the second shielding line is arranged between the dummy shielding pattern and/or the blank region and the plurality of second touch peripheral lines.

9. The touch display substrate according to claim 6, wherein a portion of each of the plurality of first touch lines and the plurality of second touch lines corresponding to the notch extends along the contour of the notch, and the dummy shielding pattern and/or the blank region is arranged at a side of the plurality of second touch lines away from the display region, and wherein the plurality of peripheral lines further comprises at least one shielding line, the shielding line is arranged between the first touch line and the second touch line, and a portion of the shielding line corresponding to the notch extends along the contour of the notch.

10. The touch display substrate according to claim 6, wherein the touch layer at least comprises at least two metal layers, patterns of the at least two metal layers at least comprise patterns of the first touch electrodes and the second touch electrodes, and the dummy shielding pattern is arranged at a same layer and made of a same material as at least one of the at least two metal layers.

11. The touch display substrate according to claim 6, wherein the dummy shielding pattern comprises a plurality of dummy lines arranged in parallel from one side close to the display region to one side away from the display region in an indentation direction of the notch, wherein lengths of at least a part of the plurality of dummy lines are different from each other to match a contour shape of the notch, and wherein the lengths of at least a part of the plurality of dummy lines increase gradually from one side close to the display region to one side away from the display region.

12. The touch display substrate according to claim 1, wherein when the ratio of the area of the touch pattern of one of the plurality of the second touch units to the area of the touch pattern of one of the plurality of the first touch units is greater than 0 and less than or equal to the first threshold, touch patterns of at least a part of the plurality of second touch units comprise real touch patterns with a touch function and dummy touch patterns decoupled from the real touch patterns, the real touch patterns are arranged at a same layer and made of a same material as the dummy touch patterns, and the real touch patterns are coupled to the second touch lines and the first touch lines, and the dummy touch patterns are decoupled from the second touch lines and the first touch lines.

13. The touch display substrate according to claim 6, wherein the plurality of peripheral lines further comprises at least one grounded line, and the grounded line is arranged at a side of the second touch line away from the display region.

14. The touch display substrate according to claim 1, wherein at least one edge corner of the touch layer is provided with two adjacent second touch units, a ratio of an area of the touch pattern of one second touch unit to the area of the touch pattern of one of the plurality of the first touch units is greater than 0 and less than or equal to the first threshold, and a ratio of an area of the touch pattern of the other second touch unit to the area of the touch pattern of one of the plurality of the first touch units is greater than or equal to the second threshold and less than 100%.

15. A method for manufacturing the touch display substrate according to claim 1, comprising:
providing a base substrate; and
forming a touch layer on the base substrate,
wherein the touch layer comprises a plurality of touch units arranged in an array form, the plurality of touch units comprises a plurality of touch units with complete touch patterns, known as first touch units, and a plurality of touch units with incomplete touch patterns, known as second touch units, at least a part of the plurality of second touch units is arranged in an outer edge region of the touch layer, a ratio of an area of the touch pattern of one of the plurality of the second touch units to an area of the touch pattern of one of the plurality of the first touch units is greater than 0 and less than or equal to a first threshold, and/or greater than or equal to a second threshold and less than 100%, and the first threshold is less than the second threshold.

16. A touch display device, comprising:
the touch display substrate according to claim 1; and
a touch circuitry electrically coupled to the touch layer and configured to combine one of the plurality of the second touch units and an adjacent touch unit into one touch unit for touch signal transmission when the ratio of the area of the touch pattern of one of the plurality of the second touch units to the area of the touch pattern of one of the plurality of the first touch units is greater than 0 and less than or equal to the first threshold, and/or take one of the plurality of the second touch units as an independent touch unit for touch signal transmission when the ratio of the area of the touch pattern of one of the plurality of the second touch units to the area of the touch pattern of one of the plurality of the first touch units is greater than or equal to a second threshold and less than 100%.

17. The touch display device according to claim 16, wherein when the ratio of the area of the touch pattern of one of the plurality of the second touch units to the area of the touch pattern of one of the plurality of the first touch units is greater than 0 and less than or equal to the first threshold, an outer contour of an orthogonal projection of each touch pattern of at least a part of the plurality of second touch units onto the base substrate is partially indented to form a notch, and the touch display device further comprises a cover plate, and an edge of the cover plate is provided with a light shielding layer, wherein an orthogonal projection of the light shielding layer onto the base substrate overlaps with the orthogonal projection of the notch onto the base substrate, and the orthogonal projection of the touch pattern of the plurality of second touch units onto the base substrate is provided with the blank region in a region corresponding to the notch; or the orthogonal projection of the light shielding layer onto the base substrate fully or partially overlaps with the orthogonal projection of the notch onto the base substrate, the touch display substrate further comprises the dummy shielding pattern arranged on the base substrate, and the orthogonal projection of the dummy shielding pattern onto the base substrate is at least partially arranged in the orthogonal projection of the notch onto the base substrate.

* * * * *